Oct. 21, 1958  E. F. WEBB  2,857,487
CONTROL SWITCH FOR WINDSHIELD CLEARING SYSTEMS
Filed Oct. 25, 1954  2 Sheets-Sheet 1

INVENTOR.
EDMOND F. WEBB
BY *Rudolph L. Lowell*
ATTORNEY.

Oct. 21, 1958   E. F. WEBB   2,857,487
CONTROL SWITCH FOR WINDSHIELD CLEARING SYSTEMS
Filed Oct. 25, 1954   2 Sheets-Sheet 2

INVENTOR.
EDMOND F. WEBB
BY
ATTORNEY.

United States Patent Office 2,857,487
Patented Oct. 21, 1958

2,857,487

CONTROL SWITCH FOR WINDSHIELD CLEARING SYSTEMS

Edmond F. Webb, Franklin, Mich., assignor to The Delman Company, Cookeville, Tenn., a corporation of Tennessee Application October 25, 1954, Serial No. 464,367

2 Claims. (Cl. 200—61.86)

This invention relates generally to vehicle windshield clearing systems and more particularly to a control switch for concurrently operating the wiper and washer units in such systems.

An object of this invention is to provide an improved control switch for concurrently operating the wiper and washer units in windshield clearing systems.

A further object of this invention is to provide a switch unit for the pump in a windshield clearing system for operating the windshield wiper motor concurrently with actuation of the pump to operate the washer unit in the system.

Another object of this invention is to provide an electric switch unit which includes a pair of relatively movable contact carrying members mounted on a shaft and arranged so that the contacts carried thereby are movable into and out of circuit closing positions at any relatively rotated position of the members on the shaft.

Still another object of this invention is to provide a switch unit for the plunger of the pump in a windshield clearing system which is mounted on the plunger for movement to a circuit closing poistion on depression of the plunger and to a circuit opening position on retraction of the plunger.

Yet a further object of this invention is to provide an improved control switch for windshield clearing systems which is simple in construction, economical in cost and efficient in operation to provide for a concurrent operation of the wiper and washer units in such systems.

Further objects, features, and advantages of the invention will become apparent from a consideration of the following description when taken in connection with the accompanying drawing in which.

Figure 1:
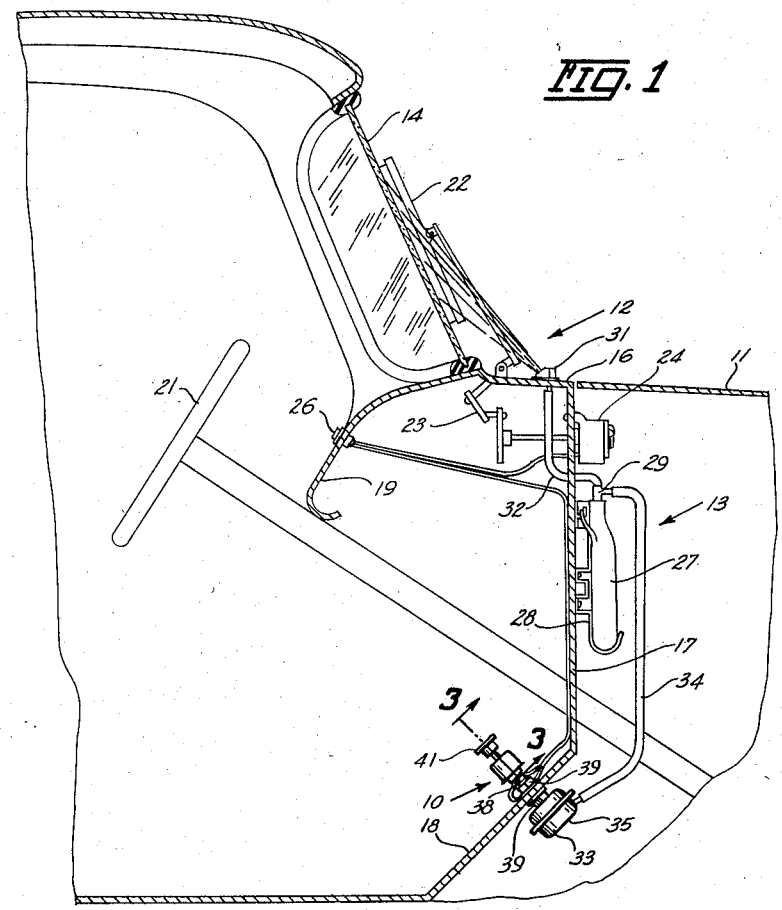
Fig. 1 is a fragmetary longitudinal foreshortened sectional view of a vehicle showing a windshield clearing system embodying the control switch of this invention.

With reference to the drawing, the control switch of this invention, indicated generally at 10, is illustrated in Fig. 1 in assembly relation with a vehicle 11 having a wiper unit and a washer unit, indicated generally by the numerals 12 and 13, respectively. The vehicle 11 has the usual windshield 14, an engine cowl 16 extending downwardly and forwardly from the lower end of the windshield 14, and an upright fire wall 17 extended downwardly from the forward end of the cowl 16. An upwardly and forwardly inclined toe-board 18 has its forward end secured to the lower end of the fire wall 17, and the usual dashboard 19 and steering wheel 21 are located rearwardly of the fire wall 17.

The wiper unit 12 includes the usual windshield wipers 22, only one of which is shown in Fig. 1, mounted for oscillation by a linkage 23 operated by an electric motor 24 secured to the fire wall 17. The motor 24 is connected in circuit with the usual vehicle battery (not shown) and the usual manual control switch 26 is carried on the dashboard 19.

The washer unit 13 (Fig. 1) includes a flexible fluid reservoir 27 carried on a bracket 28 secured to the fire wall 17 and a three-way valve unit 29 carried at the upper end of the reservoir 27. The valve unit 29 is connected with a discharge nozzle 31, mounted on the vehicle cowl 16, by a flexible fluid conduit 32, and to a pump 33 of conventional diaphragm type, carried on the vehicle floorboard 18, by a second flexible fluid conduit 34.

Figure 2:
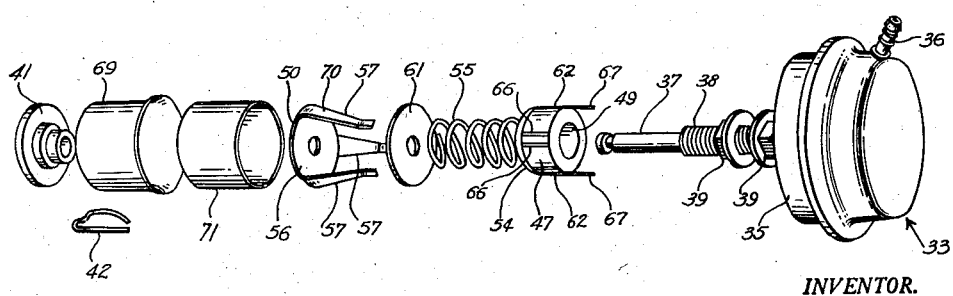
Fig. 2 is an exploded perspective view of the pump and switch assembly used in the windshield clearing system illustrated in Fig. 1.

As best appears in Fig. 2, the pump 33 includes a hollow body member 35 having a fluid connection 36, which receives one end of the flexible fluid conduit 34, and a plunger 37 which is reciprocally movable relative to the body member 35. A threaded mounting stud 38, secured to and projected upwardly from the body member 35, receives the plunger 37 and carries a pair of nut and washer assemblies 39. As best appears in Fig. 1, the body member 35 is arranged below the toe board 18 with the mounting stud 38 projected upwardly through the toe board 18 and secured thereto by the nut and washer assemblies 39 which are arranged on opposite sides of the toe board 18. The mounting stud 38 functions as a bearing for guiding the reciprocal movement of the plunger 37 which carries an actuating plate 41 removably mounted on the upper end of the plunger 37 by a spring clip 42.

It is seen, therefore, that upon depression of the plunger 37, in response to foot pressure on the plate 41, fluid is forced from the pump 33 through the flexible conduits 34 and 32 for travel from the discharge nozzle 31 as jets of fluid directed against the windshield 14 and into the paths of travel of the wipers 22. On retraction of the pump plunger 37, fluid is drawn from the reservoir 27 into the pump 33 for subsequent discharge.

The control switch 10 (Figs. 2, 3 and 4) is assembled on the pump plunger 37 between the stud 38, which is rigid with the pump body member 35 and therefore constitutes a part of the body member 35, and the actuating plate 41. The switch 10 includes an annular ring or body member 47 having a rounded upper end 54 and a central bore 48, of a diameter only slightly larger than the diameter of the pump plunger 37 and having an enlarged lower portion 49 of a diameter slightly greater than the diameter of the stud 38. The body member 47, which is constructed of a non-conducting or insulating material such as bakelite or the like, is positioned about the pump plunger 37 so that the shoulder 51 formed at the juncture of the bore 48 and the enlarged bore section 49 is against the upper end 52 of the stud 38. An annular cavity 53, formed in the upper end 54 of the body member 47 in a concentric relation with the bore 48, receives the lower end of a compression spring 55 for a purpose to appear later.

Carried on the body member 47 at a position below the upper end 54 thereof, are a pair of spaced contact members 62 (Fig. 5) extended peripherally about the body member 47. The contact members 62 are held on the body 47 by inwardly directed extensions 63 formed at the ends 64 of the contact members 62 and received in upright grooves 66 formed in the body member 47.

Arranged on the plunger 37 at a position above and in a spaced relation with the body member 47 (Figs. 3 and 4) is a contact member 50 which includes an annular plate member 56, formed of a conducting metal, and integrally formed with three equally spaced downwardly extended spring fingers 57. Each finger 57 has an elongated main portion 70 inclined inwardly toward the other fingers 57 and short outwardly extended lateral projections 58 at the lower ends of the portions 70, with the junctures 68 of the portions 70 and extensions 58 being inwardly rounded or curved. The contact member 50 is movable on the plunger 37 toward and away from the body member 47 with the curved finger member portions 68 riding on the outer surface of the body member 47, and facilitating engagement of the fingers 57 with the rounded upper end 54 of the body member 47 and the contacts 62.

Figure 4:
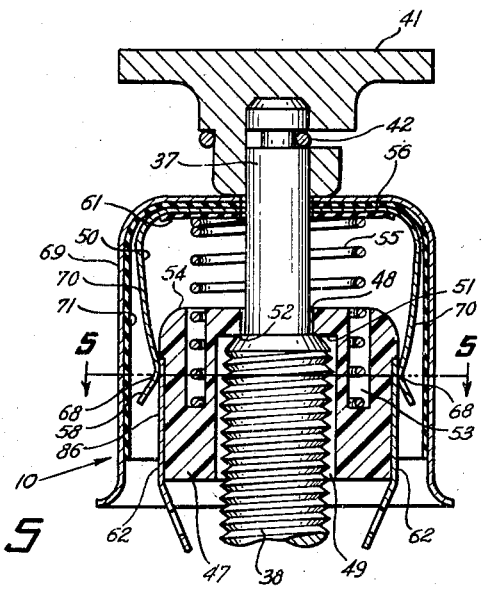
Fig. 4 is a sectional view of the pump and switch assembly of this invention, illustrated similarly to Fig. 3, and showing the switch in a closed position corresponding to a depressed position of the pump plunger.
Figure 5:
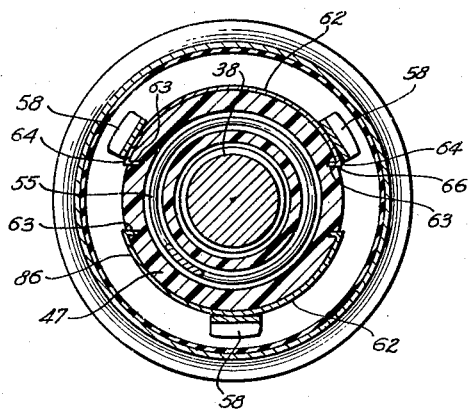
Fig. 5 is a transverse sectional view as seen along the line 5—5 in Fig. 4.

The spring fingers 57 (Figs. 2, 3 and 4) are spaced apart a distance to snugly receive the body member 47 therebetween with the portions 68 of the fingers 57 in positive contact with the peripheral surface of the body member 47 by virtue of the spring construction of the fingers 57. As shown in Fig. 5, the fingers 57 are spaced such that when the contact member 50 is moved downwardly so that the member 47 is positioned partially within the formation of finger members 57, at least two of the fingers 57 positively engage the contacts 62. Stated otherwise, in the Fig. 4 position of the switch 10, the fingers 57 are spaced apart, in a direction peripherally of the body member 47, less than the length of the contacts 62 in the same direction, to provide for the engagement of at least two of the fingers 57 with the contacts 62 at any relatively rotated position of the contact member 50 on the plunger 37. Thus for any rotated position of the contact member 50 on the plunger 37, the stationary contacts 62 are circuit connected by the movable contact 50.

An insulating disc 61 is positioned against the under side of the plate member 56, between the upper end of the spring 55 and the plate 56. It can thus be seen that the spring 55 acts to bias the contact member 50 away from the body member 47 so that any movement of the members 47 and 50 toward each other is against the pressure of the spring 55. Further, movement of the contact member 50 can only take place on depression of the plunger 37, with the actuating plate 41 acting to move the contact member 50 downwardly immediately on depression of the plunger 37.

An inverted cup shape cap or housing member 69, provided on its inner side with a removable insulating lining 71, is positioned on the shaft 37 about the contact member 50 and the body member 47 for enclosing the switch mechanism.

Figure 6:
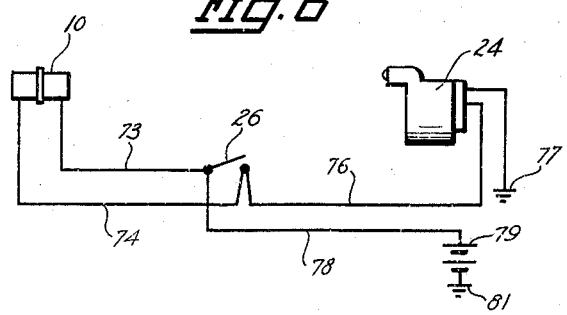
Fig. 6 is diagrammatic electrical circuit for the control device of this invention.

In assembling the pump and control switch assembly on the vehicle 11, the manual switch 26 for the wipers 22 and the control switch 10 are connected in parallel as shown in Fig. 6, by use of the conductors 73 and 74, connected to ears 67 on the contacts 62 for the switch 10. A conductor 76 connects the switches 10 and 26 with the wiper motor 24 which is grounded at 77 and a conductor 78 extends between the switches 10 and 26 and the vehicle battery 79 which is grounded at 81. It can thus be seen, that on closing either of the switches 10 and 26, a circuit is completed through the battery 79 and the motor 24 for operating the motor to oscillate the wipers 22.

Figure 3:
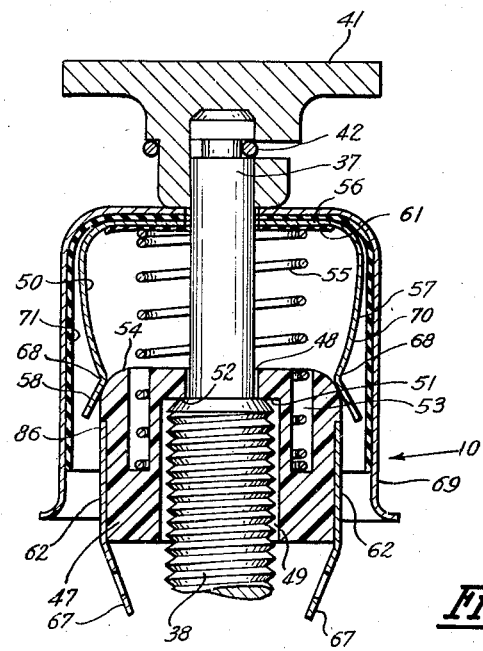
Fig. 3 is a fragmentary longitudinal sectional view of the pump and switch assembly showing the control switch in an open position corresponding to a retracted position of the pump plunger.

In the operation of the clearing system shown in Fig. 1 with the control switch 10, it can be seen from Fig. 3 that on an initial depression of the pump plunger 37, fluid is discharged from the discharge nozzle 31 against the windshield 14. During this initial depression of the plunger 37 a distance corresponding to the distance between the portions 68 of the fingers 57 and the upper ends 86 of the stationary contacts 62, no operation of the wiper motor 24 is obtained since the circuit for the motor 24 is open at the switch 10. On further depression of the plunger 37 a continued discharge of fluid is maintained, and at least two of the finger members 57 on the movable contact 50 are moved into engagement with the contacts 62 carried by the body member 47, to thereby close the switch 10 and operate the windshield wiper motor 24. This closed position of the switch 10 is illustrated in Fig. 4, and as long as the pump plunger 37 is maintained in its depressed position, shown in Fig. 4, the switch 10 remains closed and the windshield wipers 22 continue to operate. As soon as the windshield 14 is satisfactorily cleaned, the pump plunger 37 is released for retraction under the influence of the diaphragm which forms a part thereof, with the spring 55 acting to move the contact fingers 57 out of engagement with the contacts 62 and thereby move the switch 10 to its open position illustrated in Fig. 3.

It will be appreciated, of course, that the pump plunger 37 may be successively depressed as many times as necessary to repeatedly apply fluid to the windshield 14 to properly clean the same. As soon as the pump plunger 37 is retracted, the circuit for the motor 24 is opened and operation of the wipers 22 is stopped. The manual control switch 26 is used in the usual manner to operate the windshield wiper unit 12 by itself when the washer unit 13 is not required.

From a consideration of the above description, it is seen that this invention provides a compact control switch 10 which is readily assembled on a pump 33 for operation with the pump 33. Thus, no additional operation by the vehicle operator is required to operate the windshield washer and wiper units 12 and 13 concurrently than is required to operate the conventional washer unit 13 separately. The vehicle operator can maintain both hands on the steering wheel 21 while cleaning the windshield 14. Further by virtue of its compact construction, the control switch 10 does not take up any substantial floor space and is readily mounted and installed on the pump plunger 37.

The arrangement and shape of the fingers 57 and contacts 62 provide for a positive closing of the circuit for the motor 24 on depression of the pump plunger 37. Further, the provision of three fingers 57 provides for a nesting of the contact member 50 in the housing 69 and precludes any tipping of the contact member 50 within the housing 69, during reciprocal movement of the contact 50.

Although the invention has been described with respect to a preferred embodiment thereof, it is to be understood that it is not to be so limited, since changes can be made therein which are within the full intended scope of this invention as defined by the appended claims.

I claim:

1. An electrical control switch for the wiper motor in a vehicle windshield clearing system having a pump wherein a stationary body member includes a tubular mounting portion and a reciprocally movable manually actuated plunger extended through said mounting portion, said switch comprising a non-conducting tubular body member positioned about the outer terminal end of said tubular mounting, a pair of peripherally spaced axially extended contacts on said non-conducting body member, with one of the ends of said contacts being spaced from the outer end of said non-conducting body member, a contact unit including an inverted cup shape housing mounted on said plunger for movement therewith and in a covering relation with said non-conducting body member, a contact member within said housing mounted on said plunger for movement therewith, said contact member including conductor fingers for slidably engaging said axially extended contacts, said fingers being engageable with the outer end of said non-conducting body member when said plunger is extended and being slidably engageable with said axially extended contacts when said plunger is depressed, and means for insulating said contact member relative to said plunger and housing.

2. An electrical control switch for the wiper motor in a vehicle windshield clearing system having a pump wherein a stationary body member includes a tubular mounting portion and a reciprocally movable manually actuated plunger extended through said mounting portion, said switch comprising an insulated tubular contact support fixed about the outer terminal end of said mounting portion, a pair of axially extended peripherally spaced contacts on said contact support having one of their ends terminating short of the outer end of said contact support, an inverted cup shape housing having the base portion thereof positioned above said plunger with the side wall thereof in a covering concentrically spaced relation with said contact support, a contact member positioned about said plunger and within said housing including contact fingers for slidably engaging said axially extended contacts, with said fingers being engageable with the outer end of said contact support when said plunger is extended and being slidably engageable with said axially extended contacts when said plunger is depressed, means for insulating said contact member relative to said housing, a spring means mounted about said plunger and arranged in compression between said contact member and insulated body member, other means for insulating said contact member relative to said spring means, and a removable abutment member on said plunger engageable with the outer surface of the base portion of said housing.

References Cited in the file of this patent
UNITED STATES PATENTS

| | | |
|---|---|---|
| 1,744,940 | White | Jan. 28, 1930 |
| 1,998,821 | Rockwell | Apr. 23, 1935 |
| 2,162,985 | West | June 20, 1939 |
| 2,526,061 | Batcheller | Oct. 17, 1950 |
| 2,617,136 | Rappl | Nov. 11, 1952 |
| 2,626,336 | Chute | Jan. 20, 1953 |
| 2,702,918 | Neufeld | Mar. 1, 1955 |